No. 839,329. PATENTED DEC. 25, 1906.
W. SNEE.
APPARATUS FOR SEPARATING METALS FROM ORES.
APPLICATION FILED APR. 3, 1906.
2 SHEETS—SHEET 1.
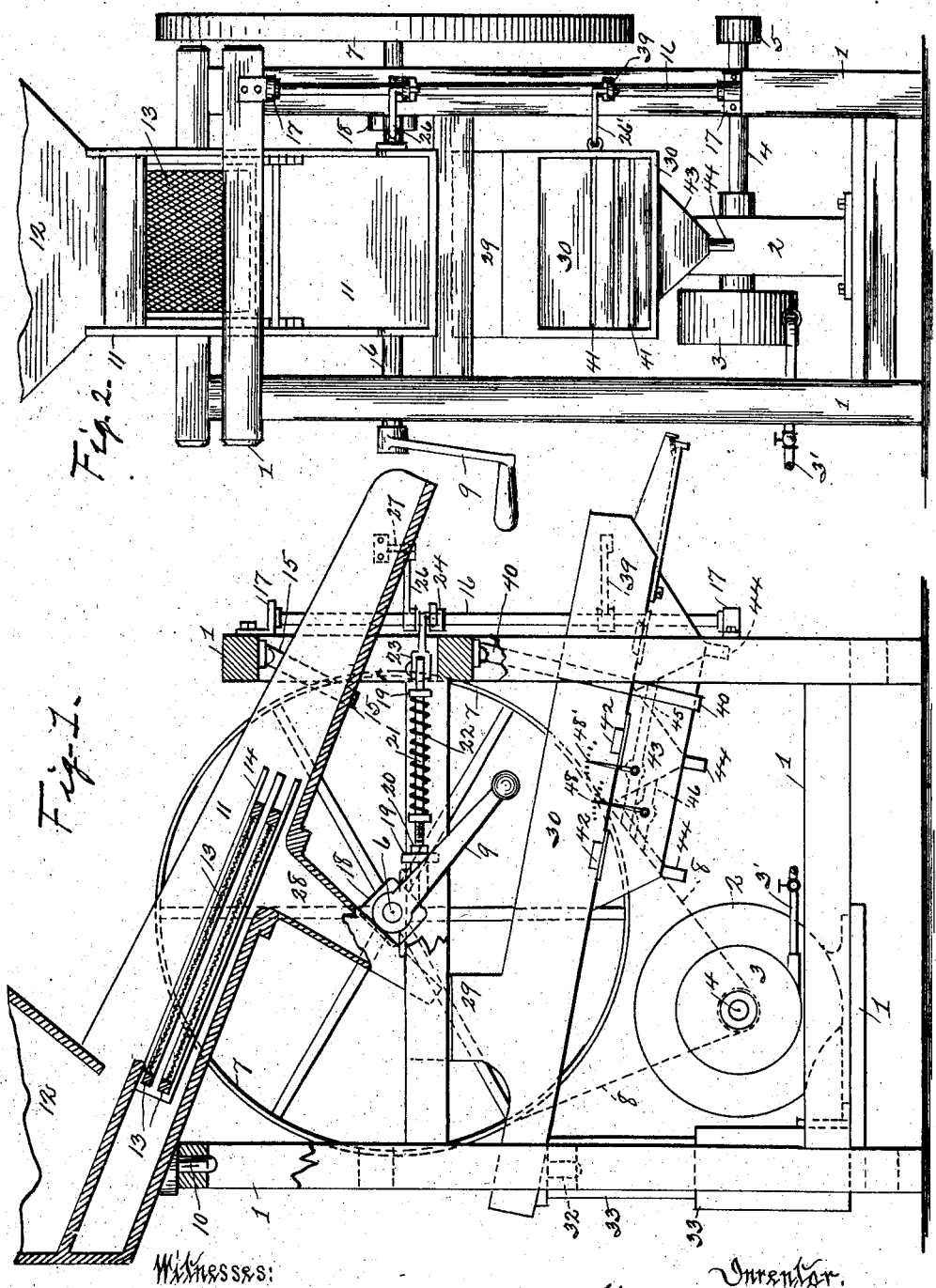

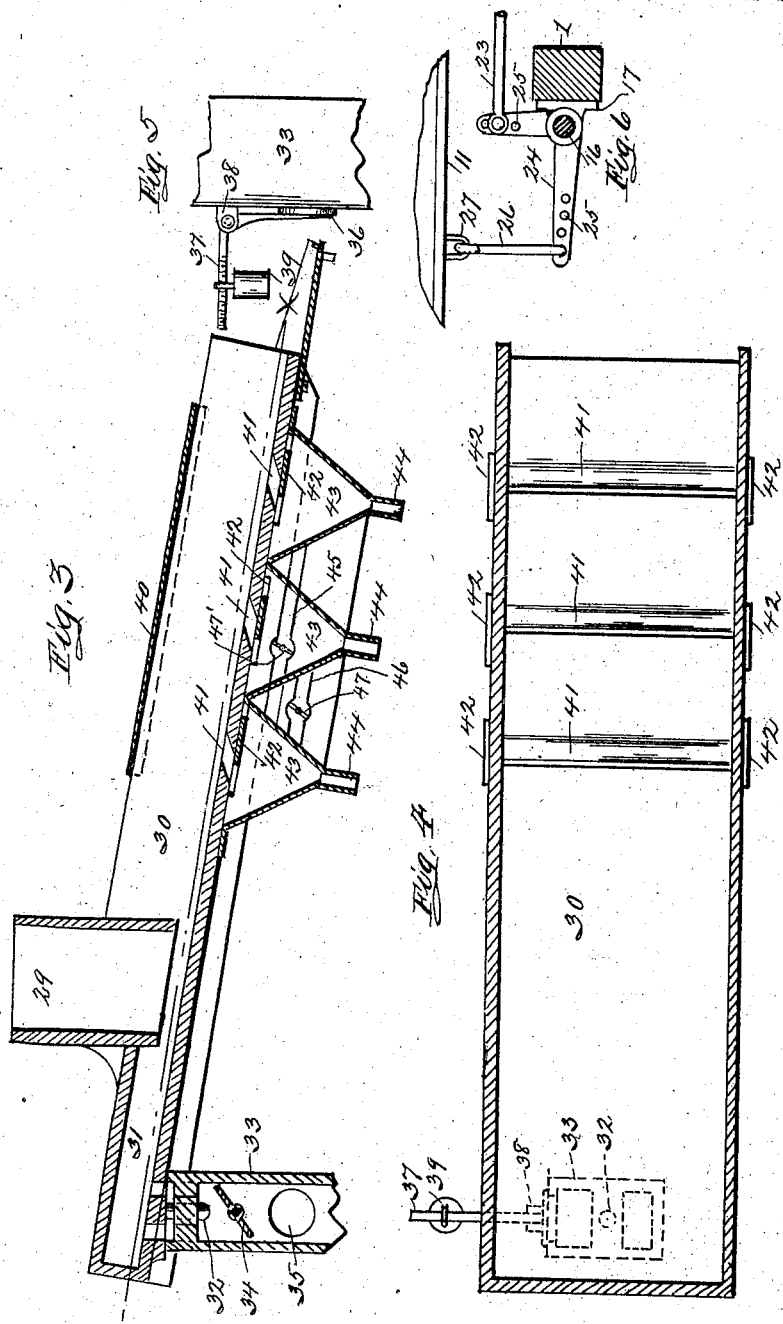

UNITED STATES PATENT OFFICE.

WILLIAM SNEE, OF WEST ELIZABETH, PENNSYLVANIA, ASSIGNOR TO JOHN A. SNEE, OF WEST ELIZABETH, PENNSYLVANIA.

APPARATUS FOR SEPARATING METALS FROM ORES.

No. 839,329. Specification of Letters Patent. Patented Dec. 25, 1906.

Application filed April 3, 1906. Serial No. 309,635.

*To all whom it may concern:*

Be it known that I, WILLIAM SNEE, a citizen of the United States, residing at West Elizabeth, in the county of Allegheny and State of Pennsylvania, have invented certain new and useful Improvements in Apparatus for Separating Metal from Ores, &c.; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an improved apparatus for separating gold and other metals from sand, pulverized ore, &c.; and it consists in the certain details of construction and combination of parts, as will be fully described hereinafter.

In the accompanying drawings, Figure 1 is a side elevation of my improved apparatus, a part of which is shown in longitudinal section, the same being constructed and arranged in accordance with my invention. Fig. 2 is a front elevation of the same. Fig. 3 is a side sectional elevation of the separating-chute, together with its attached gathering-receptacles and air-regulating device. Fig. 4 is a sectional plan view of the same, the section being taken on the line *x x* of Fig. 3. Fig. 5 is a rear elevation of a portion of the air-passage, showing the construction of the relief-valve. Fig. 6 is a sectional plan view of one of the cranks and its connection for rocking or oscillating the chute.

To construct an apparatus in accordance with my invention, and thereby provide a means for extracting gold and other metals from pulverized or granulated material and what is known in the art as "black sand," wherein gold is found in minute particles, I form from suitable material a frame 1, of suitable size and construction, and arrange therein a fan or blower 2, of ordinary form, and a means, such as a rotary engine 3 or hand-crank 9, to give the same a rapid rotary movement. Mounted upon a shaft 6 in suitable bearings in the upper portion of the frame 1 is a large band-wheel 7, connected by a belt 8 to a small pulley 5, attached to the driving-shaft 4 of the fan or blower 3. Above the shaft 6 is a screening-chute 11, attached to the frame 1 at the rear by a pin or pivot 10, the said chute being provided at its elevated end with a hopper 12 and two or more parallel-arranged removable screens 13, mounted in slides 14, which screens may be withdrawn and replaced with others of fine or coarse mesh, depending upon the material operated on. This chute 11 is supported at its forward end by a flexible strap 15 and is connected to a rock-shaft 16 by a bell-crank 24 (see detailed view, Fig. 6) and link 26. This rock-shaft 16 is mounted in a vertical position in bearings 17, attached to the frame 1, and derives its motion from a cam 18, mounted on the shaft 6, the said cam transmitting motion to a horizontally-arranged bar 21, slidably mounted in bearings 19 and fitted with a spring 22 to recover said bar and attached to the bell-crank 24 by a connecting-bar 23 in such manner that a movement of said crank will impart a corresponding movement to the chute 11, giving the same an oscillation motion about its pivotal connection 10. Beneath the removable screens 13 is a supplemental chute 28, leading to and discharging into a box 29, forming a part of the separating-chute 30, pivoted in an inclined position below. This upper chute 11 serves to remove the coarser portions of the material thrown into the hopper 12 and deliver the screened and more valuable parts to the chute 30 below. This above-mentioned lower chute 30 is attached to the frame by a pin or pivot 32 and is formed at the rear with an inclosed air-chamber 31, (see Figs. 3 and 4,) in communication with the discharge end of the fan 2 by means of a suitable duct or passage 33, the said passage being provided with a damper or shut-off valve 34 and a pressure-regulating valve 36, covering the opening 35. This regulating-valve consists of a bell-crank mounted in bearings 38, having a disk 36 at one end, and graduated horizontally - disposed arm 27, fitted with an adjustable weight 39 in such manner that when the damper 34 is partly closed to cut off a portion of the air-supply to the chamber 31 the said valve will automatically open and permit the air to escape through the opening 35 and relieve the back pressure on the fan 2.

The separating-chute 30 is arranged in an inclined position and is supported at its forward end by a flexible strap 40 and is attached to the rock-shaft 16 by a crank 39 and connecting-bar in the same manner as the chute 11 above described and is given an oscillating movement about its pivot 32. Formed transversely across the lower chute are openings 41, having inwardly and rearwardly inclined sides, the said openings being separated the one from the other and each provided with a sliding plate 42, whereby the area may be reduced, as shown at Figs. 3 and 4 of the drawings. Beneath each opening 41 are compartments 43, having inclined sides terminating in nozzles 44, to which may be attached vessels to receive the gold or other metals. These nozzles may be so formed that vessels may be locked thereto to prevent robbery.

In operation the fan or blower 2 and bandwheel 7 are either driven by the hand-crank 9 or the rotary engine 3, imparting an oscillating lateral movement to the two chutes 11 and 30. The material operated upon is thrown into the hopper 12, passing over the screens 13. The small particles enter the supplemental chute 28 and the coarse portions pass over and are discharged from the end of the chute 11. This sifted material enters the chute 30 and is met with an air-blast from the chamber 31, which carries the light portions of the same over the openings 41, while the metal and other heavy particles drop to the floor of the chute 30. The vibrating side movement of this chute 30 will cause the material to slowly travel downward, and said material being thus constantly agitated will spread out, giving the air-blast an opportunity to remove all light substances. During the continued passage of the residue the gold contained therein drops into the first opening 41 and is carried down its inclined side and deposited in the receptacle 43 beneath. Should any of the metal pass over the first opening 41 by the action of the air-blast, it is caught by the second opening, and, if not there, by the third and last, thereby saving and separating all the metal.

In practice the air-pressure is regulated by the damper 34 and weighted regulating-valve 36, the amount of pressure used being proportional to the size and weight of the particles of metal in the material.

Supplemental communicating ducts are arranged in the compartments 43, by which the air-blast may travel from one to the other. These ducts 45 and 46 are fitted with valves or dampers 47 and 47', which are regulated and controlled by levers 48 and 48', the said levers acting as indicators on graduated scales placed on the exposed side of the chute 30. The one duct 45 leads from the rear compartment to the front and the other duct 46 from the rear to the middle compartment. By means of these ducts an air circulation is maintained between the several compartments, said ducts being used to carry fine particles of dust or other substance from the front compartments to that in the rear to be collected therein. This circulation of the dust is due to the agitation of the separating-chute and the elevated position of the discharge ends of said ducts.

It is obvious that various slight modifications and changes may be made in the details of construction without departing from the spirit of the invention. Therefore I do not wish to confine myself to the exact construction shown and described, but wish to claim all such modified forms as would come properly within the general scope of the invention.

Having thus described my invention, what I claim, and desire to secure by Letters Patent, is—

1. In a separating apparatus such as described, the chute 30, having an oscillating lateral movement, transverse openings formed in the bottom of said chute, slide-valves operating to regulate the area of said openings, in combination with an air-blast directed over and at right angles with the openings, as and for the purpose described.

2. In a separating apparatus such as described, the chute 30, having an oscillating lateral movement, transverse openings formed in the bottom of said chute, slide-valves operating to regulate the area of said openings, in combination with an air-blast directed over and at right angles with the openings and a means for automatically regulating the pressure of said blast, as described.

3. In a separating apparatus such as described, the combination comprising the upper chute provided with screens and means for giving the same an oscillating lateral movement, a separating-chute arranged below adapted to receive the screened material, means for oscillating said chute, transverse openings formed in said chute, an air-chamber at one end thereof, a means for supplying air to said chamber and means for regulating and controlling the amount of said air, as and for the purpose described.

4. In combination with the frame of an inclined chute carrying a hopper pivoted thereto, screens in said chute, a separating-chute having openings in its bottom, a supplemental chute below the screen-chute to convey the screened material to the separating-chute, an air-chamber and means for supplying air under pressure to the air-chamber and separating-chute, a rock-shaft, means at the lower end of each chute connected with the rock-shaft for imparting to each a lateral oscillating movement, slide-valves to open or close the openings in the bottom of the separating-chute and suitable receptacles arranged below the openings, substantially as set forth.

In testimony whereof I affix my signature in presence of two witnesses.

WILLIAM SNEE.

Witnesses:
HENRY F. WEAVER,
F. J. KERRIGAN.